(12) United States Patent
Naterer et al.

(10) Patent No.: US 11,149,940 B2
(45) Date of Patent: Oct. 19, 2021

(54) HEAT EXCHANGER USING NON-PURE WATER FOR STEAM GENERATION

(71) Applicants: Greg Naterer, St John's (CA); Zhaolin Wang, Whitby (CA); Edward Secnik, Pickering (CA)

(72) Inventors: Greg Naterer, St John's (CA); Zhaolin Wang, Whitby (CA); Edward Secnik, Pickering (CA)

( * ) Notice: Subject to any disclaimer, the term of this patent is extended or adjusted under 35 U.S.C. 154(b) by 22 days.

(21) Appl. No.: 15/656,450

(22) Filed: Jul. 21, 2017

(65) Prior Publication Data
US 2017/0321882 A1 Nov. 9, 2017

Related U.S. Application Data

(62) Division of application No. 13/820,435, filed as application No. PCT/CA2011/000342 on Mar. 30, 2011, now abandoned.
(Continued)

(51) Int. Cl.
*F22B 1/06* (2006.01)
*C01B 3/08* (2006.01)
(Continued)

(52) U.S. Cl.
CPC .............. *F22B 1/06* (2013.01); *B01D 1/0047* (2013.01); *B01D 1/0058* (2013.01); *C01B 3/045* (2013.01);
(Continued)

(58) Field of Classification Search
CPC .......... F28D 7/106; F28D 19/00; F28D 19/04; F28D 2021/0098; F28D 15/00; F28F 5/06;
(Continued)

(56) References Cited

U.S. PATENT DOCUMENTS

| 1,634,714 | A | * | 7/1927 | Hiller | F28D 7/106 |
| | | | | | 165/143 |
| 1,944,478 | A | * | 1/1934 | Tuckermann | F22B 27/16 |
| | | | | | 122/39 |

(Continued)

FOREIGN PATENT DOCUMENTS

| DE | 102006014853 A1 * 10/2007 | .............. F22B 27/16 |
| EP | 0555078 B1 2/1993 | |

(Continued)

OTHER PUBLICATIONS

G.F. Naterer, K. Gabriel, Z.L. Wang, V.N. Daggupati, R. Gravelsins, Thermochemical hydrogen production with a copper-chlorine cycle. I: oxygen release from copper oxychloride decomposition, Available online Sep. 11, 2008, International journal of hydrogen energy 33, pp. 5439-5450 (Year: 2008).*

(Continued)

*Primary Examiner* — Joel M Attey
*Assistant Examiner* — For K Ling
(74) *Attorney, Agent, or Firm* — Norton Rose Fulbright Canada LLP (57) ABSTRACT

A process and a device are described for producing high purity and high temperature steam from non-pure water which may be used in a variety of industrial processes that involve high temperature heat applications. The process and device may be used with technologies that generate steam using a variety of heat sources, such as, for example industrial furnaces, petrochemical plants, and emissions from incinerators. Of particular interest is the application in a thermochemical hydrogen production cycle such as the Cu—Cl Cycle. Non-pure water is used as the feedstock in the thermochemical hydrogen production cycle, with no need to adopt additional and conventional water pre-treatment and purification processes. The non-pure water may be selected from brackish water, saline water, seawater, used (Continued)

water, effluent treated water, tailings water, and other forms of water that is generally believed to be unusable as a direct feedstock of industrial processes. The direct usage of this water can significantly reduce water supply costs.

12 Claims, 9 Drawing Sheets

Related U.S. Application Data (60) Provisional application No. 61/379,981, filed on Sep. 3, 2010.

(51) Int. Cl.
| | |
|---|---|
| *C01B 13/02* | (2006.01) |
| *F22B 27/16* | (2006.01) |
| *F28D 3/02* | (2006.01) |
| *F28D 7/10* | (2006.01) |
| *F28D 21/00* | (2006.01) |
| *C02F 1/16* | (2006.01) |
| *B01D 1/00* | (2006.01) |
| *C01B 3/04* | (2006.01) |
| *F22B 37/26* | (2006.01) |
| *C02F 1/00* | (2006.01) |

(52) U.S. Cl.
CPC ............ *C01B 3/08* (2013.01); *C01B 13/0203* (2013.01); *C02F 1/16* (2013.01); *F22B 27/165* (2013.01); *F22B 37/265* (2013.01); *F28D 3/02* (2013.01); *F28D 7/106* (2013.01); *F28D 21/0001* (2013.01); *C02F 1/001* (2013.01); *Y02E 60/36* (2013.01); *Y02W 10/37* (2015.05)

(58) Field of Classification Search
CPC ..... F28F 2265/18; F28F 2265/22; F27D 3/08; F27D 2009/0016; F26B 17/18; F26B 17/22; F22B 1/06; F22B 1/16; F22B 1/167; F22B 3/02; F22B 1/063; F22B 1/1884; F22B 27/14; F22B 27/16; F22B 27/165; F22B 27/02; F22B 7/02; F22B 7/08; F22B 7/10; F22B 23/00; F22G 1/02; F22G 1/04; C10F 1/16; C10G 9/34; C01B 3/08; C01B 3/10; C01B 3/105; C01B 3/068; B01D 1/10; B01D 1/225; B01D 1/226; B01D 1/06; B01D 1/065; B01D 1/08; C02F 1/04; C02F 1/048; C02F 1/06; C02F 1/08; C02F 1/16; C21B 7/10
USPC .............. 165/120, 140, 141, 104.11, 104.14; 165/104.15; 159/2.2, 2.3, 23, 24.2; 432/139, 154
See application file for complete search history.

(56) References Cited

U.S. PATENT DOCUMENTS

| | | | | |
|---|---|---|---|---|
| 2,232,544 A | * | 2/1941 | Lorenz | .................. C11D 13/04 554/114 |
| 2,798,542 A | * | 7/1957 | Drewitt | .................... D01D 1/06 159/4.04 |
| 3,253,053 A | | 5/1966 | Bergougnou | |
| 3,625,273 A | * | 12/1971 | Buschor | ................. B01D 1/225 159/13.2 |
| 3,722,445 A | | 3/1973 | Karig | |
| 3,939,803 A | | 2/1976 | Meissner | |
| 3,995,012 A | | 5/1976 | Okamura | |
| 3,982,586 A | | 9/1976 | Ruble | |
| 4,016,066 A | | 4/1977 | Shiraiwa | |
| 4,049,502 A | * | 9/1977 | Nagels | ..................... B01D 1/10 202/206 |
| 4,140,176 A | | 2/1979 | Essebaggers | |
| 4,169,583 A | * | 10/1979 | Cramer | ..................... F22B 1/06 266/114 |
| 4,202,744 A | | 5/1980 | Pan | |
| 4,321,106 A | * | 3/1982 | Burkhard | ............... B01D 1/225 159/49 |
| 4,340,207 A | | 7/1982 | Bruhn | |
| 4,437,968 A | | 3/1984 | Elliott, Jr. | |
| 4,666,561 A | * | 5/1987 | DuFresne | ................ A23C 1/12 156/DIG. 23 |
| 5,101,772 A | | 4/1992 | Bruhn | |
| 5,220,954 A | | 6/1993 | Longardner | |
| 5,397,376 A | | 3/1995 | Greenwalt | |
| 5,630,862 A | | 5/1997 | Greenwalt | |
| 5,876,679 A | | 3/1999 | D'Aciemo | |
| 6,513,422 B1 | * | 2/2003 | Palm | ..................... A23C 3/037 261/116 |
| 6,610,879 B2 | | 8/2003 | Yoneda | |
| 6,766,772 B2 | | 7/2004 | Van Dongen | |
| 6,767,665 B1 | | 7/2004 | Ohrem | |
| 6,827,911 B1 | | 12/2004 | Gering | |
| 6,835,307 B2 | | 12/2004 | Talbert | |
| 6,840,199 B2 | | 1/2005 | Van Dongen | |
| 6,886,501 B2 | | 5/2005 | Bosch | |
| 7,037,430 B2 | | 5/2006 | Donaldson | |
| 7,611,677 B2 | | 11/2009 | Louret | |
| 7,611,678 B2 | | 11/2009 | Louret | |
| 7,803,349 B1 | | 9/2010 | Muradov | |
| 7,837,768 B2 | | 11/2010 | Sanderson | |
| 8,623,174 B1 | * | 1/2014 | Duesel, Jr. | ............... B01D 1/14 159/16.1 |
| 2009/0047204 A1 | | 2/2009 | Kim | |
| 2009/0060826 A1 | | 3/2009 | Ohashi | |
| 2009/0170964 A1 | | 7/2009 | Fayyaz | |
| 2010/0025260 A1 | * | 2/2010 | Naterer | ..................... C01B 3/08 205/637 |
| 2010/0129287 A1 | * | 5/2010 | Gabriel | ..................... B01J 7/00 423/657 |

FOREIGN PATENT DOCUMENTS

| | | |
|---|---|---|
| JP | 4359702 A | 12/1992 |
| JP | 5172304 A | 7/1993 |
| WO | 8404955 | 12/1984 |
| WO | 2009021736 | 2/2009 |
| WO | 2009129233 A2 | 10/2009 |

OTHER PUBLICATIONS

English translation of International Patent document No. WO 84/04955 dated Dec. 20, 1984; https://encrypted.google.com/patents/WO1984004955A1?cl=en; accessed on Jul. 19, 2017.
Telstar Life Science Solutions, "Pure Steam Generators—CPS", http://www.telstar-lifesciences.com/en/technologies/pw+wfi+and+pharmaceutical+steam+and+pure+steam/steam+generators/pure+steam+generators+-+psg.htm, accessed on Jan. 18, 2011.
Canadian Intellectual Property Office, Office Action dated Feb. 23, 2017 re: Application No. 2,810,068.
English translation of Abstract re: Japanese Patent document No. 4359702 (A) dated Dec. 14, 1992.
English translation of Abstract re: Japanese Patent document No. 5172304 (A) dated Jul. 9, 1993.
PCT international Search Report and Written Opinion dated Jun. 23, 2011 re: International Application No. PCT/CA2011/000342.

\* cited by examiner

HEAT EXCHANGER USING NON-PURE WATER FOR STEAM GENERATION

CROSS-REFERENCE TO RELATED APPLICATIONS AND CLAIM OF PRIORITY

The present application is a divisional of U.S. patent application Ser. No. 13/820,435, which is a national phase application under 35 U.S.C. 371 of International Application No. PCT/CA2011/000342 filed Mar. 30, 2011, which claims priority to U.S. Provisional Application No. 61/379,981 filed Sep. 3, 2010. The entire contents of each of the above-referenced disclosures are incorporated herein by reference.

TECHNICAL FIELD

A process and a device are described for producing high purity and high temperature steam from non-pure water which may be used in a variety of industrial processes that involve high temperature heat applications. The process and device may be used with technologies that generate steam using a variety of heat sources, such as, for example industrial furnaces, petrochemical plants, and emissions from incinerators. Of particular interest is the application in a thermochemical hydrogen production cycle. Non-pure water is used as the feedstock in the thermochemical hydrogen production cycle, with no need to adopt additional and conventional water pre-treatment and purification processes. The non-pure water may be selected from lake water, brackish water, saline water, seawater, used water, effluent treated water, tailings water, and other forms of water that are generally believed to be unusable as a direct feedstock of industrial processes. The direct usage of this water significantly reduces water supply costs.

BACKGROUND

Hydrogen is widely believed to be one of the world's next generation fuels, since its oxidation does not emit greenhouse gases that contribute to climate change. Auto manufacturers are investing significantly in hydrogen vehicles. Other transportation vehicles, such as ships, trains and utility vehicles also represent promising opportunities for use of hydrogen fuel. Hydrogen is also a major necessity for the upgrading of heavy oils and fertilizer production. Thus there is need for a reliable, safe, efficient and economic process for the production of hydrogen gas for fuel, heavy oil upgrading and fertilizer production.

Electrolysis is a proven, commercial technology that separates water into hydrogen and oxygen using electricity. Net electrolysis efficiencies are typically about 24%. In contrast, thermochemical reactions to produce hydrogen using nuclear heat can achieve heat-to-hydrogen efficiencies up to about 50% [See Schultz, K., Herring, S., Lewis M., Summers, W., "The Hydrogen Reaction", *Nuclear Engineering International*, vol. 50, pp. 10-19, 2005 and Rosen, M. A., "Thermodynamic Comparison of Hydrogen Production Processes", *International Journal of Hydrogen Energy*, vol. 21, no. 5, pp. 349-365, 1996.]

A copper-chlorine (Cu—Cl) cycle has been identified by Atomic Energy of Canada Ltd. (AECL) [See Sadhankar, R. R., Li, J, Li, H., Ryland, D. K., Suppiah, S. "Future Hydrogen Production Using Nuclear Reactors", Engineering Institute of Canada—Climate Change Technology Conference, Ottawa, May, 2006 and Sadhankar, R. R., "Leveraging Nuclear Research to Support Hydrogen Economy", 2nd Green Energy Conference, Oshawa, June, 2006.] at its Chalk River Laboratories (CRL) as a highly promising thermochemical cycle for hydrogen production. Water is decomposed into hydrogen and oxygen through intermediate Cu and Cl compounds. Past studies at Argonne National Laboratory (ANL) have developed enabling technologies for the Cu—Cl thermochemical cycle, through an International Nuclear Energy Research Initiative (INERI), as reported by Lewis et al. [See 17. Lewis, M. A., Serban, M., Basco, J. K, "Hydrogen Production at <550° C. Using a Low Temperature Thermochemical Cycle", ANS/ENS Exposition, New Orleans, November, 2003.] The Cu—Cl cycle is well matched to Canada's nuclear reactors, since its heat requirement for high temperatures is adaptable to the Super-Critical Water Reactor (SCWR), which is being considered as Canada's Generation IV nuclear reactor.

Other countries (Japan, U.S. and France) are currently advancing nuclear technology for thermochemical hydrogen production [See Sakurai, M., Nakajima, H., Amir, R., Onuki, K., Shimizu, S., "Experimental Study on Side-Reaction Occurrence Condition in the Iodine-Sulfur Thermochemical Hydrogen Production Process", International Journal of Hydrogen Energy, vol. 23, pp. 613-619, 2000; Schultz, K., "Thermochemical Production of Hydrogen from Solar and Nuclear Energy", Technical Report for the Stanford Global Climate and Energy Project, General Atomics, San Diego, Calif., 2003; and Doctor, R. D., Matonis, D. T., Wade, D. C, "Hydrogen Generation Using a Calcium-Bromine Thermochemical Water-splitting Cycle", Paper ANL/ES/CP-3-111623, OECD 2nd Information Exchange Meeting on Nuclear Production of Hydrogen, Argonne, Ill., Oct. 2-3, 2003.]

The Sandia National Laboratory in the U.S. and CEA in France are developing a hydrogen pilot plant with a sulphur-iodine (S—I) cycle [See Pickard, P., Gelbard, F., Andazola, J., Naranjo, G., Besenbruch, G., Russ, B., Brown, L., Buckingham, R., Henderson, D., "Sulfur-Iodine Thermochemical Cycle", DOE Hydrogen Production Report, U.S. Department of Energy, Washington, D.C., 2005 Fuel Cell Vehicles: Race to a New Automotive Future, Office of Technology Policy, US Department of Commerce, January, 2003.] The Korean KAERI Institute is collaborating with Japan Atomic Energy Agency (JAEA) aims to complete a large S—I plant to produce 60,000 $m^3$/hr of hydrogen by 2020, which will be sufficient for about 1 million fuel cell vehicles [See Suppiah, S., Li, J., Sadhankar, R., Kutchcoskie, K. J., Lewis, M., "Study of Hybrid CuCl Cycle for Nuclear Hydrogen Production", Third Information Exchange Meeting on the Nuclear Production of Hydrogen, Orai, Japan, October, 2005.] Several countries, participating in the Generation IV International Forum plan to develop the technologies for co-generation of hydrogen by high-temperature thermochemical cycles and electrolysis, through multilateral collaborations [See Rosen, M. A., "Thermodynamic Analysis of Hydrogen Production by Thermochemical Water Decomposition using the Ispra Mark-10 Cycle", In Hydrogen Energy Prog. VIII: Proc. 8th World Hydrogen EnergyConference, ed. T. N. Veziroglu and P. K. Takahashi, Pergamon, Toronto, pp. 701-710, 1990.]

When compared to other methods of hydrogen production, the thermochemical Cu—Cl cycle has its own unique advantages, challenges, risks and limitations. Technical challenges include the transport of solids and electrochemical processes of copper electrowinning, which are not needed by other cycles such as the sulfur-iodine cycle. These processes are challenging due to solids injection/removal, which can block equipment operation and generate undesirable side reactions in downstream chemical reactors. Flow of solid materials can lead to increased maintenance costs, due to wear and increased downtime arising from blockage and unscheduled equipment failure. A technological risk involves the potential use of expensive new materials of construction that are needed to prevent corrosion of equipment surfaces. These include surfaces exposed to molten CuCl, spray drying of aqueous $CuCl_2$ and high temperature HCl and $O_2$ gases. Additional operational challenges entail the steps of chemical separation (which increases complexity and costs) and phase separation (particles, gas, and liquids must be separated from each other in fluid streams leaving the reactors). As a result, the overall cycle efficiency becomes a limitation, wherein the Cu—Cl cycle must compete economically against other existing technologies of hydrogen production.

Despite these challenges and risks, the Cu—Cl cycle offers a number of key advantages over other cycles of thermochemical hydrogen production. The attractions include lower temperatures compared to other cycles like the S—I cycle. Heat input at temperatures less than 530° C. make it suitable for coupling to Canada's SCWR (Super-Critical Water Reactor; Generation IV nuclear reactor) and reduced demands on materials of construction. Other advantages are inexpensive raw materials and reactions that proceed nearly to completion without significant side reactions. Solids handling is required, but it is relatively minimal and it can be reduced by combining thermochemical and electrochemical steps together. Another key advantage is the cycle's ability to utilize low-grade waste heat from power plants, for various thermal processes within the cycle.

US Patent Publication No. 2010/012987, published May 27, 2010 describes a system utilizing a thermochemical CuCl cycle in detail. The disclosures of this application are incorporated herein in their entirety.

There is a need to improve the efficiency of the Cu—Cl cycle for it to be competitive and all aspects of the cycle need to be examined for such opportunities.

SUMMARY

This disclosure related to an improved high temperature industrial process where heat recovery is desired, the improvement comprising transferring heat from a high temperature molten or gaseous material obtained in the high temperature industrial process, to generate high temperature steam from non-pure water, with the impurities in the water being reduced to a precipitate, a slurry or a concentrated aqueous solution, which can be disposed of, or subjected to further processing.

More specifically, high temperature steam is generated in a heat exchange process, wherein heat from high temperature molten or gaseous material is supplied to non-pure water to produce high temperature steam, with the impurities in the water being reduced to a precipitate, a slurry or a concentrated aqueous solution, which can be disposed of, or subjected to further processing.

In another form of the process, where high temperature steam is generated in a heat exchange process, the steam is generated from a two-stage steam generation loop which comprises two heat exchanges, a first-stage heat exchange comprising transferring heat from molten material to a thermal fluid circulating to a second-stage heat exchange, and back again to the first-stage heat exchange; heat from the thermal fluid being transferred to non-pure water in the second-stage heat exchange to produce high temperature steam from which hydrogen gas is produced, and impurities in the water are reduced to a precipitate, a slurry or a concentrated aqueous solution, which can be disposed of, or subjected to further processing.

In a particular form, the industrial process is a thermochemical Cu—Cl cycle for producing hydrogen gas from water decomposition which comprises supplying heat to the non-pure water from molten CuCl to produce high temperature steam for the production of hydrogen gas, with the impurities in the water being reduced to a precipitate, a slurry or a concentrated aqueous solution, which can be disposed of, or subjected to further processing.

When the industrial process is a thermochemical Cu—Cl cycle for producing hydrogen gas from water decomposition, it may comprise the generation of steam from non-pure water using a two-stage steam generation loop which comprises two heat exchanges, a first-stage heat exchange comprising transferring heat from molten CuCl to a thermal fluid circulating to a second-stage heat exchange, and back again to the first-stage heat exchange; heat from the thermal fluid being transferred to non-pure water in the second-stage heat exchange to produce high temperature steam from which hydrogen gas is produced, and impurities in the water are reduced to a precipitate, a slurry or a concentrated aqueous solution, which can be disposed of, or subjected to further processing.

There is also disclosed a device for use in a high temperature industrial process where heat recovery is required and high temperature steam is produced which comprises using a tube and shell heat exchanger, the tube is arranged to receive a high temperature molten or gaseous material obtained from the high temperature industrial process and the shell is arranged to receive non-pure water to which heat is transferred from the high temperature molten or gaseous material in the tube, which then generates high temperature steam from the non-pure water, with the impurities in the non-pure water being reduced to a precipitate, a slurry or a concentrated aqueous solution, which can be disposed of, or subjected to further processing.

In another form, the device is for use in a high temperature industrial process where heat recovery is desired and high temperature steam is produced, and comprises a two-stage steam generation loop which comprises two heat exchangers, each having a central tube and surrounding shell, the first-stage heat exchanger arranged for high temperature molten or gaseous material to pass through its central tube and the surrounding shell is arranged to receive a secondary thermal fluid to circulate in the surrounding shell to absorb heat from the high temperature molten or gaseous material, the surrounding shell being in fluid communication with the shell in the second-stage heat exchanger to permit circulation of the heated thermal fluid from one shell to the other and back again to the shell in the first-stage heat exchanger; the central tube of the second stage heat exchanger arranged to receive non-pure water which absorbs heat from the thermal fluid to generate high temperature steam for use in the high temperature industrial process, and impurities in the water are reduced to a precipitate, a slurry or a concentrated aqueous solution which can be disposed of or subjected to further processing.

When the industrial process is a thermochemical Cu—Cl cycle for the production of hydrogen from water decomposition and the molten material is CuCl salt, the high temperature steam is used to produce hydrogen gas from decomposition of water in the thermochemical CuCl cycle.

The molten CuCl may be received in the tube of the heat exchanger and passes therethrough with the assistance of at least one of gravity, a push-pull plate or a helical screw.

The molten CuCl may pass through the tube of the heat exchanger at a rate that allows the production of high temperature steam at a temperature suitable for the production of hydrogen gas from the decomposition of water in the thermochemical CuCl cycle. The tube wall may be treated with lubricant to assist passage of molten CuCl through the tube of the heat exchanger, in at least one of the following ways: in advance of the device being used, on a periodic basis and on a continuous basis during use of the device.

The shell walls may be washed with water or water containing cleaners or both to remove any adhered impurities that foul the apparatus, the washing taking place either when the device is in use or when the device is not in use.

Finally, a helical screw is best used as it not only assists the passage of molten CuCl through the tube, but also facilitates passage as the salt passes from a molten state to a solid state, as well as making the heat transfer from the molten CuCl to the non-pure water most efficient.

A unique characteristic of the process and device disclosed herein is that non-pure water is the feedstock used to produce high purity, high temperature steam. Normally in the Cu—Cl cycle, the water used is purified prior to use, a step which is costly and usually eliminates the possibility of using water that contains impurities or salts. Thermochemical hydrogen production is a desirable technology for supplying hydrogen and oxygen at lower cost and reducing environmental impact as compared with existing technologies, for applications to refining, upgrading, and other petrochemical plant operations. Water, heat and a minor amount of electricity are used as inputs to produce hydrogen and oxygen, without any internal consumption of materials, or external emissions to the environment. It has now been found that the Cu—Cl cycle is capable of utilizing non-pure water as feedstock and various grades of waste heat from nuclear, solar, geothermal, and petrochemical operations, such as, for example from upgraders, gasifiers, and engines for equipment may be used to heat the non-pure water to produce high temperature steam of high purity with any impurities and salts present in the water being removed as precipitates, or slurry or both, any valuable material being recovered.

The non-pure water may be lake water, brackish water, saline water, seawater, tailings water, effluent treated water, and used water from drilling wells. The heat exchanger steam generator may include a screw extruder, or a pull and push plate extruder, or a casting extruder, which allows recovery of heat from molten CuCl, high temperature $O_2$, high temperature $H_2$, high temperature HCl, or other high temperature substances and exothermic processes of the Cu—Cl cycle to a surrounding water jacket. In the present application, the use of the heat exchanger-steam generator is described with respect to the Cu—Cl cycle and the heat is obtained from molten CuCl salt. A person skilled in the art can readily adapt the equipment and process to accommodate different heat sources. The steam generation may alternatively comprise a two-stage heat exchanger which uses a secondary thermal fluid other than water. In the first stage, the secondary thermal fluid flows through the said jacket to extract the heat from molten salt, and then in the second stage, steam is generated from the secondary fluid using another heat exchanger.

Any indirect contact between molten salt (or high temperature gas as it occurs in the S—I cycle) and non-fresh water can generate steam, so the steam generation is not limited to a thermochemical cycle of hydrogen production, but may be utilized in other high temperature heat recovery applications such as industrial furnaces, petrochemical plants emissions, and incinerators. For the example of the Cu—Cl cycle, the only feedstock is non-pure water and the products are hydrogen and oxygen, with no other waste streams flowing, except salts and other impurities for the case of brackish water. The main energy input to the Cu—Cl cycle is heat, significantly recycled internally or low-grade heat. In the Cu—Cl cycle, steam reacts with auxiliary compounds of Cu and Cl to form intermediates, then hydrogen and oxygen are released from the intermediates, while the intermediates are recycled internally without being consumed.

The non-pure water is directly fed into the Cu—Cl hydrogen production cycle without using additional heat in the present apparatus and processes. In comparison, other hydrogen production cycles must utilize water that is treated and purified in a separate process, and additional energy must be input for the treatment and purification. The typical distribution of energy requirements of the Cu—Cl cycle are shown in the accompanying drawings.

When non-pure water is used as the direct feedstock of the Cu—Cl cycle, the non-pure water is used directly without further external thermal energy input for the processing. Other processes of the Cu—Cl cycle still need further external thermal energy input for the thermochemical hydrogen production.

Previously, if non-pure water was used, it was preferably used after additional treatment and purification, but the treatment and purification requirements set out herein are simpler than for other traditional steam generators.

Non-pure water, before it can be used, preferably requires additional water treatment and/or purification which involves additional energy before it can be used in a Cu—Cl thermochemical hydrogen production. The treatment and purification requirements of the present disclosure are simpler and the additional energy required thereof is much less than for other traditional steam generators.

Cu—Cl cycles are known in the art and may comprise a number of variants. For example, the Cu—Cl cycle may comprise a five step process comprising the steps of
1) reacting Cu and dry HCl gas at a temperature of about 450° C. to obtain hydrogen gas and molten CuCl salt;
2) subjecting solid CuCl and HCl to electrolysis at a temperature of about 70 to about 90° C. to obtain Cu and an aqueous slurry containing HCl and $CuCl_2$;
3) heating the aqueous slurry obtained from step 2 at a temperature of from about 375 to about 450° C. to obtain solid $CuCl_2$ and $H_2O$/HCl vapours;
4) heating the solid $CuCl_2$ and water/steam to obtain solid $CuOCuCl_2$ and gaseous HCl; and
5) heating the solid $CuOCuCl_2$ obtained in step 4) at a temperature of from about 500 to about 530° C. to obtain molten CuCl salt and oxygen gas.

Alternatively, the Cu—Cl cycle may comprise a four step process comprising the steps of
1) reacting Cu and dry HCl gas at a temperature of about 450° C. to obtain hydrogen gas and molten CuCl salt;
2) subjecting solid CuCl and HCl to electrolysis at a temperature of about 70 to about 90° C. to obtain Cu and an aqueous slurry containing HCl and $CuCl_2$;
3) heating the aqueous slurry containing HCl and $CuCl_2$ at a temperature of from about 375 to about 450° C. to obtain solid $CuOCuCl_2$ and gaseous HCl; and
4) heating the solid $CuOCuCl_2$ at a temperature of from about 500 to about 530° C. to obtain molten CuCl salt and oxygen gas.

A further alternative allows the use of a Cu—Cl cycle that comprises a three step process comprising the steps of 1) reacting Cu and dry HCl gas at a temperature of about 450° C. to obtain hydrogen gas and molten CuCl salt;
2) subjecting solid CuCl and HCl to electrolysis at a temperature of about 70 to about 90° C. to obtain Cu and an aqueous slurry containing HCl and $CuCl_2$;
3) heating the aqueous slurry containing HCl and $CuCl_2$ at a temperature of from about 500 to about 530° C. to obtain molten CuCl salt and oxygen gas.

A further alternative allows the use of a Cu—Cl cycle that comprises another three step process as follows:
1) subjecting CuCl and HCl aqueous solution at a temperature of about 70 to 90° C. to obtain H2 and an aqueous slurry containing HCl and $CuCl_2$;
2) heating the solid $CuCl_2$ and water to obtain solid $CuOCuCl_2$ and gaseous HCl;
3) heating the aqueous slurry containing HCl and $CuCl_2$ at a temperature from about 500 to 530° C. to obtain molten CuCl salt and oxygen gas.

DETAILED DESCRIPTION

STRUCTURE, DESIGN AND OPERATION OF THE HEAT EXCHANGER-STEAM GENERATOR

Figure 1:
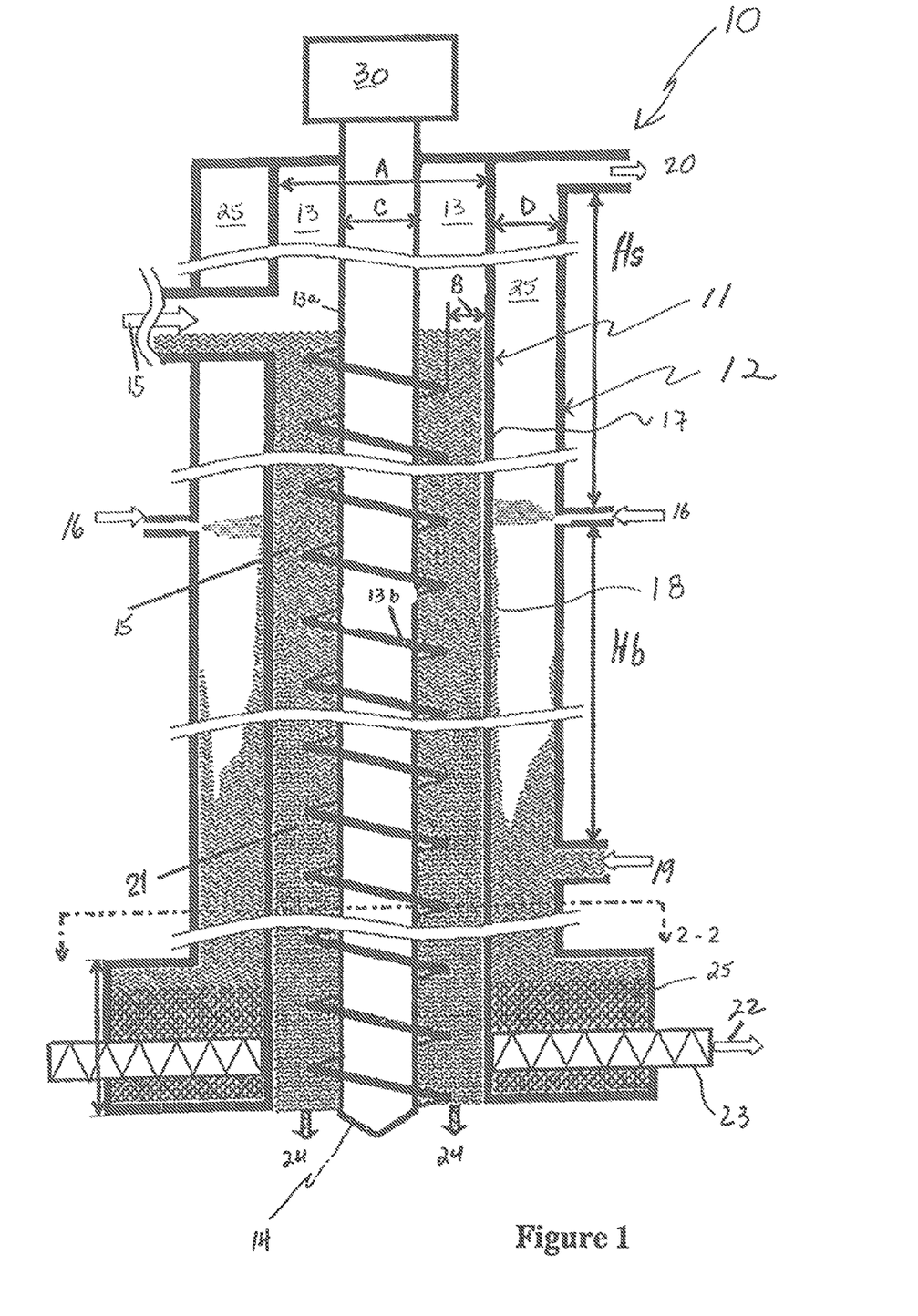
FIG. 1 illustrates a cross section of a screw extruder heat exchanger for high temperature steam generation.
Figure 2:
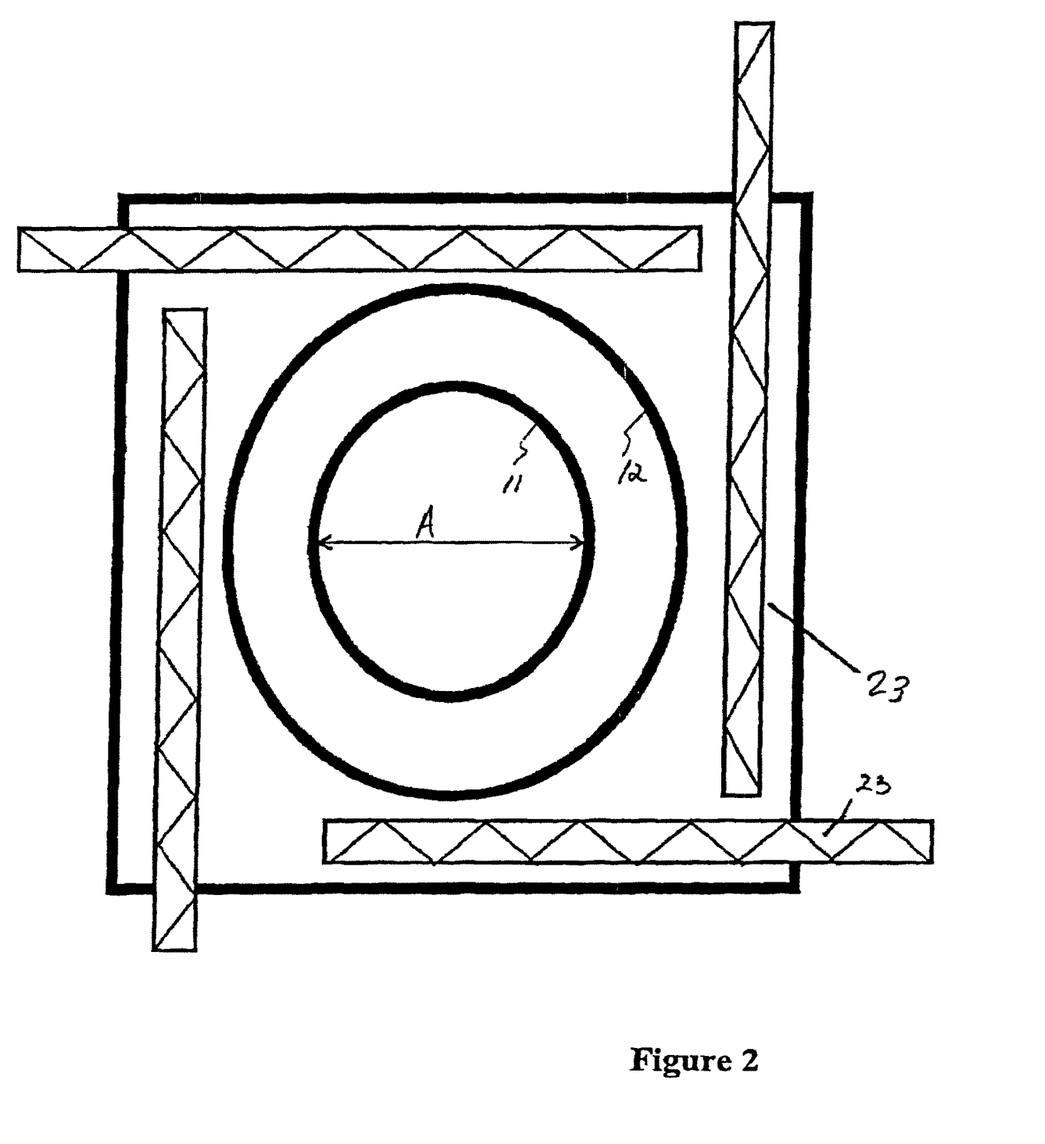
FIG. 2 illustrates the lower structure of the screw extruder steam generator shown in FIG. 1, and is a top plan and perspective view of a section along line 2-2 showing the arrangement of the screw discharger for the precipitates or slurry or both from the non-pure water, after the steam has been generated.

One form of the apparatus of the present description is illustrated in FIGS. 1 and 2 of the accompanying drawings. A continuous production mode screw extruder-steam generator for steam generation of this invention is shown generally at 10 in FIG. 1, it consists of inner and outer annular tubes, 11 and 12, respectively. The inner tube 11 contains a rotary screw 14 to agitate and push molten salt to move downward through a central or core chamber 13, surrounded by an outer chamber 25, both being formed by the outer tube 12 and inner tube 11. The inner chamber has an inlet where a feed 15 of molten CuCl at a temperature of from about 420 to about 900° C., usually about 530° C. is provided to the inner chamber 13. The base of the reactor has an outlet for removal of solidified CuCl shown at 24.

Non-pure water at a temperature ranging from about 0 to about 100° C., and typically at 20° C. is fed at inlet 16 into the outer chamber or jacket 25. The chamber 25 also includes an inlet 19 at which a continuous water stream at a temperature of about 0 to 100° C., and typically from about 10 to about 40° C., with 20° C. being typical is fed to chamber 25. Water is sprayed onto the outside wall of the inner tube 11 to form a water film. When the film is flowing downward, water accumulates, boils and vaporizes. The water can be introduced also by a continuous flow stream via inlet 19. An outlet for the steam is provided at 20 from the outer chamber. The temperature of the steam generated is in the range of about 100 to about 500° C. and the optimum range is about 300 to about 400° C. The temperature of the molten salt entering the inside tube is in the range of about 420 to about 900° C. and the optimum range is about 450 to about 530° C. The steam pressure can be in the range of about 0 to about 250 bar (gauge) and the optimum range is about 0 to about 2 bar gauge so that high temperature steam can be generated. The diameter of inner tube 11A is in the range of about 5 to about 100 cm and the optimum range is about 15 to about 45 cm. The space for the flights of the screw, B is in the range of about 1 to about 10 cm and the optimum range is about 2 to about 5 cm. The diameter of the screw root, C, is in the range of about 1 to about 50 cm, and the optimum range is about 5 to about 20 cm. It is noted that the outside tube could be other than cylindrical in shape, for example, rectangular or square. Between the two inlets 16 and 19, and between the inlet 16 and the outlet 20, within the chamber 25, the temperatures achieved provide boiling water and high temperature steam, respectively.

The dimensions of the tubes 11 and 12, and the whole unit are selected to ensure the most efficient heat transfer and the generation of high temperature steam.

The molten salt can also be introduced from the top, by either continuous melt stream or pouring in this form of the apparatus. To avoid the attachment of the solidified salt onto the wall of the inner chamber 13 during the downward travel of the salt, a suitable lubricant such as grease (silicone) can be applied onto the wall. In operation, the process in this apparatus can be conducted on a continuous basis. The molten salt is introduced into the chamber 13 of the heat exchanger-steam generator and the water is introduced as a spray and as a continuous flow stream into the outer chamber 25. As the molten salt is pushed downwardly through the central chamber via the turning of screw 14, heat is transmitted to the water entering the outer chamber 25 and the height of the apparatus is selected to ensure sufficient heat transfer to generate high temperature steam from the water. Boiling water Hb is produced in a lower portion of chamber 25 which rises upwardly becoming high temperature steam Hs, which is removed via outlet 20. As steam is formed from the non-pure water, impurities and salts are deposited in the bottom of the chamber 25. These may comprise a solid precipitate or slurry or both. Removal of these materials is managed in a suitable manner known to those skilled in the art and recovery of any valuable products can be undertaken using known methods. An extruder 23 can be placed in the outlet from chamber 25 to assist in removal of the impurities/minerals etc. The molten CuCl solidifies as the heat is transferred from it to the water. As the salt cools it solidifies. Removal of the salt is undertaken in accordance with known methods for removing such solids from industrial equipment.

Figure 3:
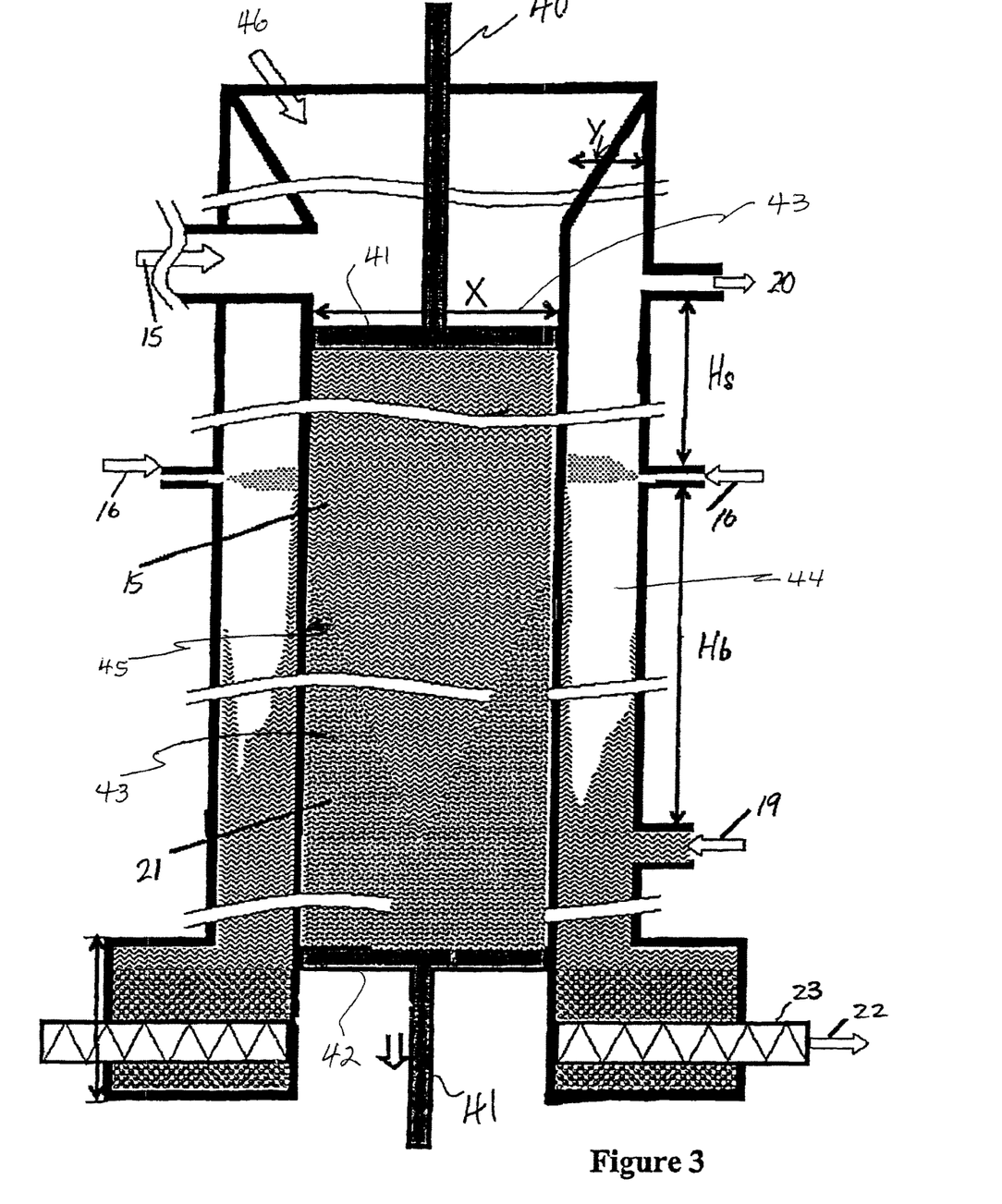
FIG. 3 illustrates a front cross-sectional view of a pull/push plate in a molten salt heat exchanger for high temperature steam generation.

In FIG. 3, there is illustrated an alternative structure for the heat exchanger-steam generator. The rotary screw of FIG. 1 is replaced with a push-pull plate arrangement shown generally at 40. A top plate 41 and a bottom plate 42 are provided in an inner salt chamber 43. The plates 41 and 42 may have the same diameter X, which allows the plates to engage interior wall 45 of chamber 43. The molten salt can be fed through a side inlet 15 and a top inlet 46. Removal of solid salt 21 can be achieved by removing the bottom plate 42. Outer chamber 44 has the same inlets and outlets found in the heat exchanger-steam generator shown in FIG. 1. However, in the arrangement shown here, the process is generally conducted as a batch or semi-batch process.

Figure 4:
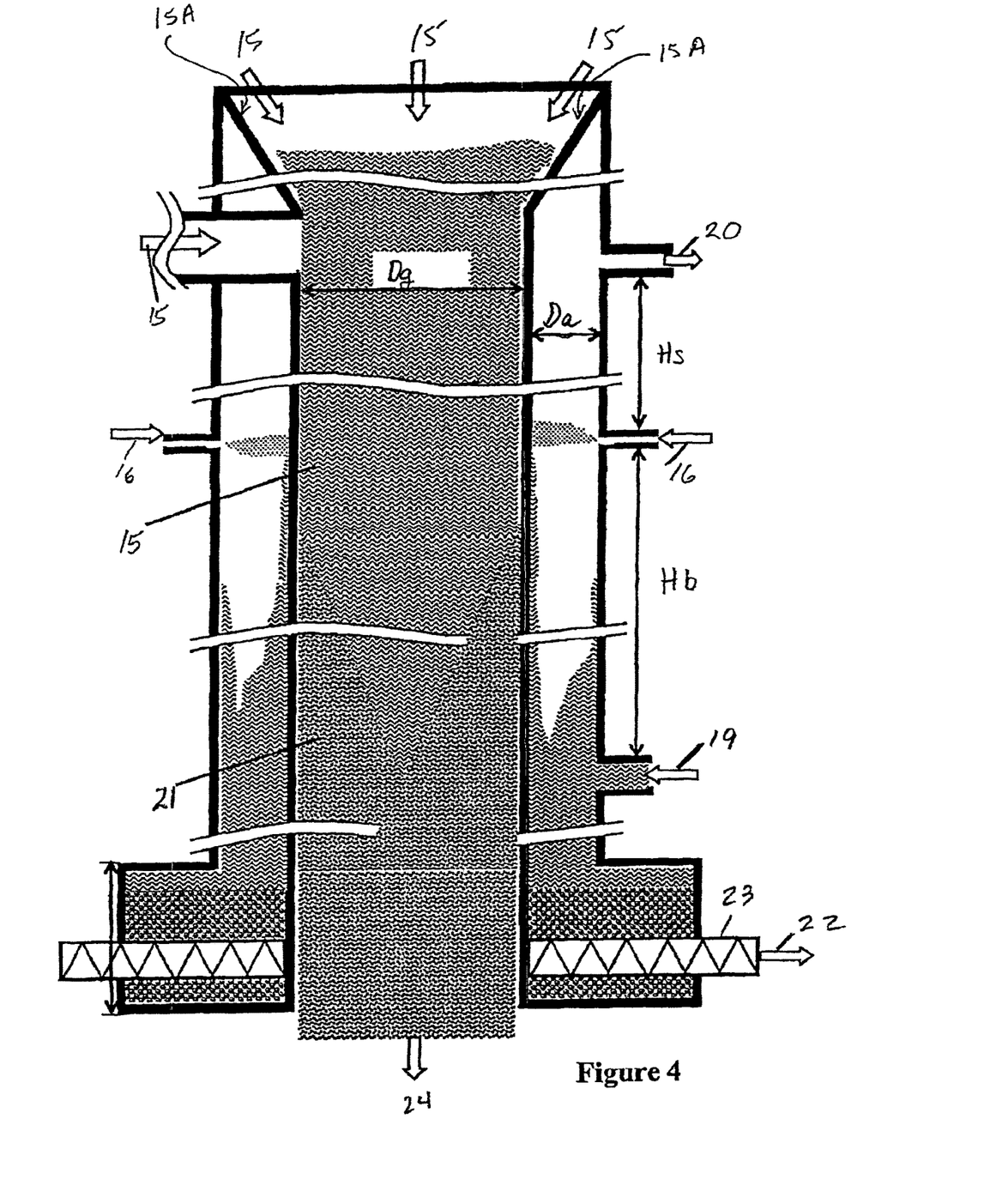
FIG. 4 illustrates a front cross-sectional view of a two-stage heat exchanger steam generator for high temperature steam generation using impure water.

FIG. 4 illustrates a further alternative arrangement for the heat exchanger-steam generator which employs a casting with a mould: molten salt steam generator. The structure here is very similar to the annular tube arrangement shown in FIG. 3. The difference is that no device is used to assist passage of molten salt through the central chamber. All other aspects of the apparatus are the same as found in the apparatus of FIG. 3. To approach a continuous operation, a surface coating such as a lubricant, for example grease is usually needed to assist the CuCl to move downwardly. When the molten CuCl is poured into the heat exchanger, the lubricant, e.g. grease may be continuously applied, e.g. by spraying onto the surface of the inside wall of the inner tube 11, as indicated by element 15A in FIG. 4. Any other known methods for distributing a lubricant such as grease onto the inside wall at appropriate locations are suitable for this purpose.

Figure 5:
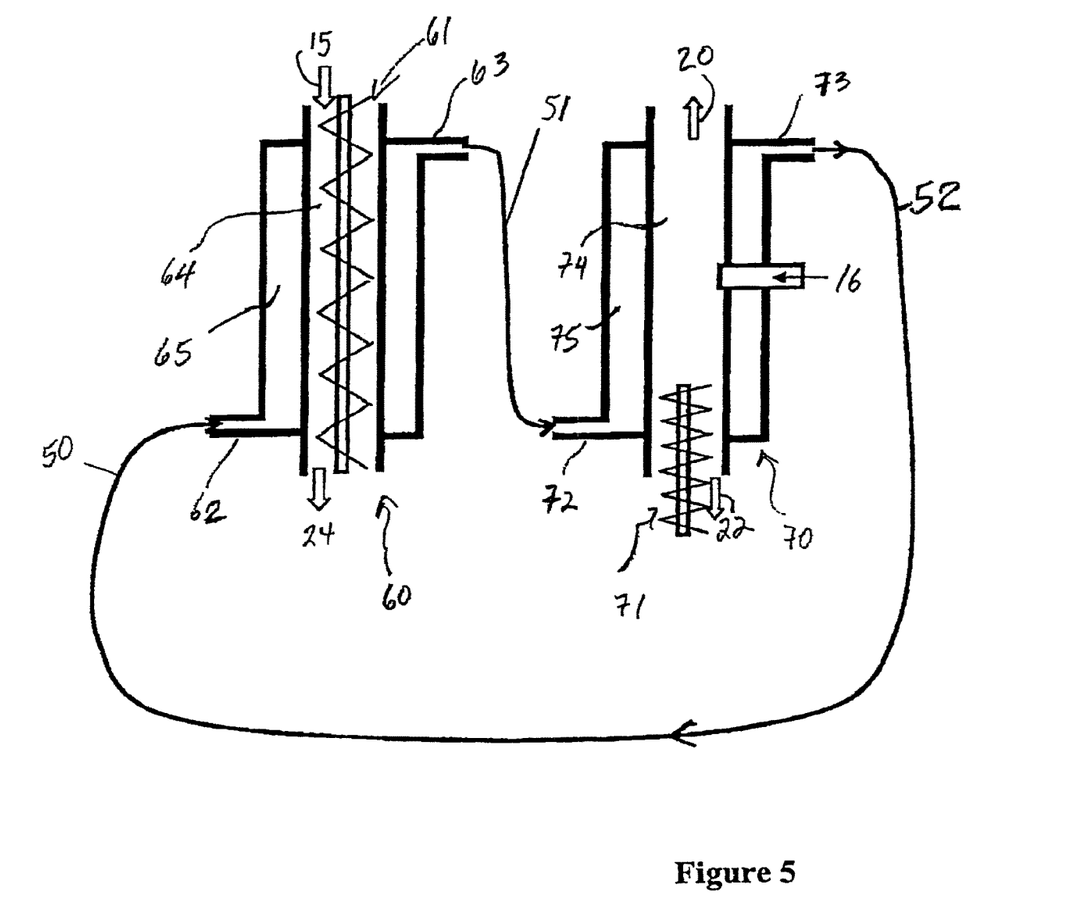
FIG. 5 illustrates a schematic representation of a two-stage steam generation loop.

FIG. 5 shows an alternative arrangement that comprises a two-stage steam generation loop. Instead of directly generating the steam by the heat of molten salt, secondary thermal fluids are utilized to extract the heat from the molten salt, and then the thermal fluid is allowed to transfer its heat to the non-pure water to generate steam in a second stage heat exchanger. A big advantage of using secondary thermal fluid is that the non-pure water can be introduced to the tube route rather than the shell path so the precipitates from the water can be more easily removed. Another advantage is that any corrosion from the non-pure water on the outside wall of the pipe that confines the molten salt is eliminated. Typical secondary fluids include thermal oil, high pressure gases such as nitrogen, helium, argon, and air.

The illustrated apparatus of FIG. 5 comprises two heat exchangers 60 and 70, each having a shell 65, 75 and tube 64, 74 design. The heat exchangers 60 and 70 are connected so that the secondary thermal fluid circulates from shell 65 to shell 75 through conduits 50, 51 and 52. In the first stage heat exchanger 60, molten salt enters tube 64 which may be provided with a rotating screw 61 for pushing the molten salt through the tube 64. Screw 61 can be replaced with an alternative device for pushing the molten salt or no device may be used. Solidified salt exits at 24 and is removed in a suitable manner. Heat from the molten salt is transferred to the thermal oil in shell 65 which circulates through conduit 5 to a second stage heat exchanger 70 into shell 75. Non-pure water is fed to the central tube 70 at inlet 16 and as it passes through the heat exchanger 70, it picks up heat from the circulating high temperature thermal oil and turns to super heated steam, which is removed from outlet 20. Precipitates or slurry or both collects in tube 74 and can be removed by a suitable device, such as a rotating screw 71, and any valuable material can be recovered in conventional ways.

Description of How the Molten Salt is Handled in the Heat Exchanger

A portion of a pilot plant was constructed incorporating the molten salt heat exchanger described herein. Referring to FIG. 1, one can see how the heat exchanger 10 handles molten salt 15a, which involves the salt being mixed and the dimensions of the tube 13 in the hear exchanger 10 being selected to ensure this mixing takes place.

A feed of molten salt 15 is introduced to the tube 13 and is then pushed downwardly by the axial pushing force of the flights 13b of the rotary screw 14. During the downward moving of the molten salt 15, the salt 15 close to the inside wall of chamber 13 is cooled to a lower temperature than the molten salt 15 close to the screw flights 13b and root 13a. At the same time, heat carried by the molten salt 15 is transferred through the wall 11 of chamber 13 to the water or steam contained in the annulus (25). Due to the radial agitating force of the flights 13b, the lower-temperature molten salt 15 close to the inside wall of chamber 13 is agitated until it is farther from the wall and closer to the screw root 13a to mix with a portion of higher temperature molten salt 15. At the same time, other portions of higher temperature molten salt 15 are agitated until closer to the inside wall of chamber 13. Some portions of molten salt 15 may solidify when the salt is agitated closer to the inside wall of chamber 13 and is then agitated back to closer to the root 13a to solidify more salt or it is melted again. Through the mixing generated by the screw flights 13b, the heat in various locations of the molten salt stream is transferred to the wall of chamber 13 and hence to the water in the chamber 25.

During the downward movement of the molten salt 15, the temperature of the salt becomes lower and lower. When the salt 15 moves near the bottom of chamber 13, all salt 15 has been solidified. At this time, the rotary screw 14 also serves as a granulator to avoid forming big chunks of solidified salt.

To achieve the functions as described above, e.g., the good mixing and granulating, the dimensions of the screw 14 and chamber 13 and the rotary speed are selected and controlled to be in an optimal range, which can be determined through routine experimentation. The channel width B is usually in the range of 1-50 cm and the optimal width is 2-20 cm. The flight width (A-8) is in the range of 0.2-10 cm and the optimal range is 1-4 cm. The helix angle Ha may be selected from those in the range of 5-85 degrees and the optimal range is 15-45 degrees. The rotary speed may be selected to be in the range of 0.5-5000 rpm and the optimal range is 1-100 rpm. These parameters are based on the pilot design and in practice can be readily adjusted to ensure maximum heat transfer and steam production.

Handling of Water Impurities in Non-Pure Water

Safe operation of the heat exchanger 10 is necessary to avoid cracking on the inside wall 17 of chamber 13. Cracking can be avoided by enhancing the thickness of the chamber wall 17 and by selecting suitable material for the inside wall of the tube 14, along with regular checks and maintenance.

When the water is evaporated on the outside wall of chamber 13, impurities will be concentrated in the remaining unevaporated water which flows downward along the wall. During the downward movement on the wall, some impurities, such as salts, will precipitate. The precipitates are entrained by the concentrated water to accumulate in the chamber 25. Due to the density difference of water and the precipitates, the precipitates settle at the bottom of chamber 25. When the quantity of precipitates exceeds the height of screw discharger 23 after some runtime, the screw discharger will operate and remove the precipitates to outside of chamber 25. The runtime depends on the steam generation rate and scale, and the screw discharger 23 can then accordingly operate intermittently or continuously.

To ensure the downward moving of the precipitated impurities with concentrated water, preferably 1-10% of the water is not evaporated so that the precipitated impurities can be entrained by the downward flowing concentrated water on the outside wall of chamber 13. Multiple water level gauges can be set to monitor the evaporation extent. The water level gauges could be any known gauges.

Figure 1A:
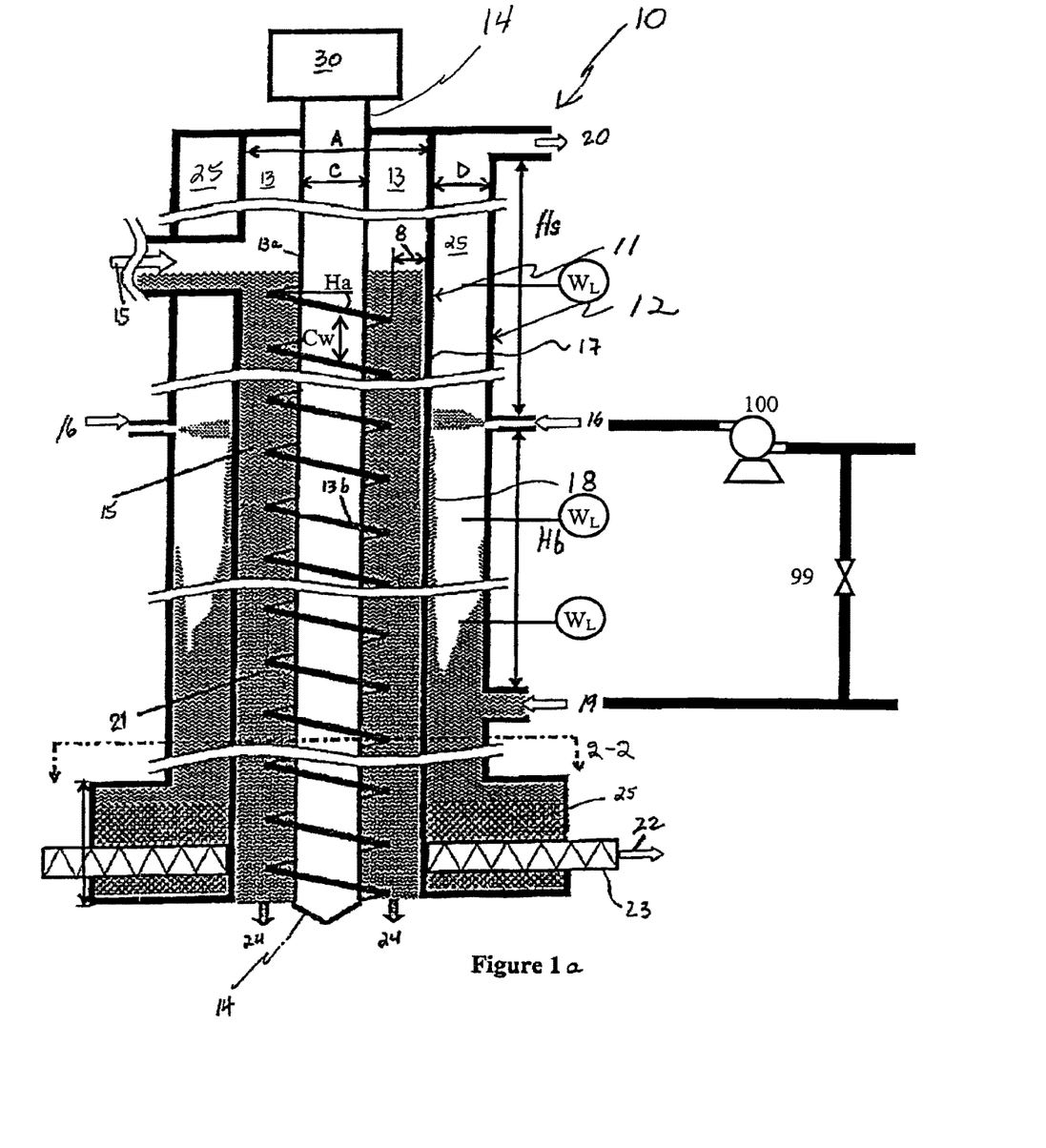
FIG. 1a illustrates the same cross section as shown in FIG. 1, but includes a closed loop whereby a water-steam chamber can be flushed out and cleaned.

Referring now to FIG. 1a, after some runtime, for example, 6 months, the outside wall of chamber 14 may be covered by a layer of precipitated impurities to foul the chamber and affect the efficient operation of the heat exchanger 10. To remove the precipitates on the wall, the process is slowed or stopped, and simultaneously the water flow rate is increased at inlet 16 to a higher value than normal, and the chamber 13 is filled with water to reach the water level of inlet 16, and then the water is pumped out through inlet 19 (now serving as an outlet) by pump 100 back to inlet 16 to form a closed liquid water loop to dissolve the precipitates and clean the outside wall of chamber 15. The speed of the water flow is selected to be in the range of 5-30 m/s. After cleaning, the closed water loop formed by inlets 16 and 19 is disconnected, then the water flow rate of inlet 16, is restarted or the molten salt processing is restarted or the molten salt processing is speeded up. The connection or disconnection of inlets 16 and 19 is controlled by valve 99. Some cleaning acids, such as, for example dilute HCl or $HNO_3$, can also be used as additives or agents, for the removal of water-insoluble impurities precipitated on the wall.

The precipitates removed from chamber 25 may carry water or be an aqueous slurry. The slurry can be conveyed to a filtration system to extract water and the extracted water can be reused for steam generation. The filtration can be conducted using any known system.

The impurities do not have to be precipitated, as they can also be produced in a highly concentrated aqueous solution which accumulates at the bottom of chamber 25. The screw discharger 23 can remove the highly concentrated water, or the screw discharger can be replaced by a simple pipe wherein the concentrated water can be pumped out. In this case an extra loop may be required to recover the water from the highly concentrated aqueous solution or disposal of it may be needed.

The equipment and technology described herein are compatible with most types of non-pure water and especially suitable for geographical areas where fresh and high quality water are not as plentiful as other areas, or where saline and brackish water are richer than fresh, high quality water, e.g., industrial regions for oil sands extraction and upgrading where the use of fresh and high quality water is strictly limited and distributed.

Brackish water is water that has more salinity than fresh water, but not as much as seawater. It may result from mixing of seawater with fresh water, as in estuaries, or it may occur in brackish fossil aquifers. Certain human activities can produce brackish water, in particular certain civil engineering projects such as dikes and the flooding of coastal marshland to produce brackish water pools for freshwater prawn farming. Brackish water is also the primary waste product of the salinity gradient power process. Because brackish water is hostile to the growth of most terrestrial plant species, without appropriate management it is damaging to the environment. Technically, brackish water contains between 0.5 and 30 grams of salt per litre—more often expressed as 0.5 to 30 parts per thousand (ppt or ‰).

Pure water is a non-conductive substance that is toxic to life, and corrosive of most metals. Impure water is water that has impurities, such as salts, hardness, metal ions, and so on.

Figure 8:
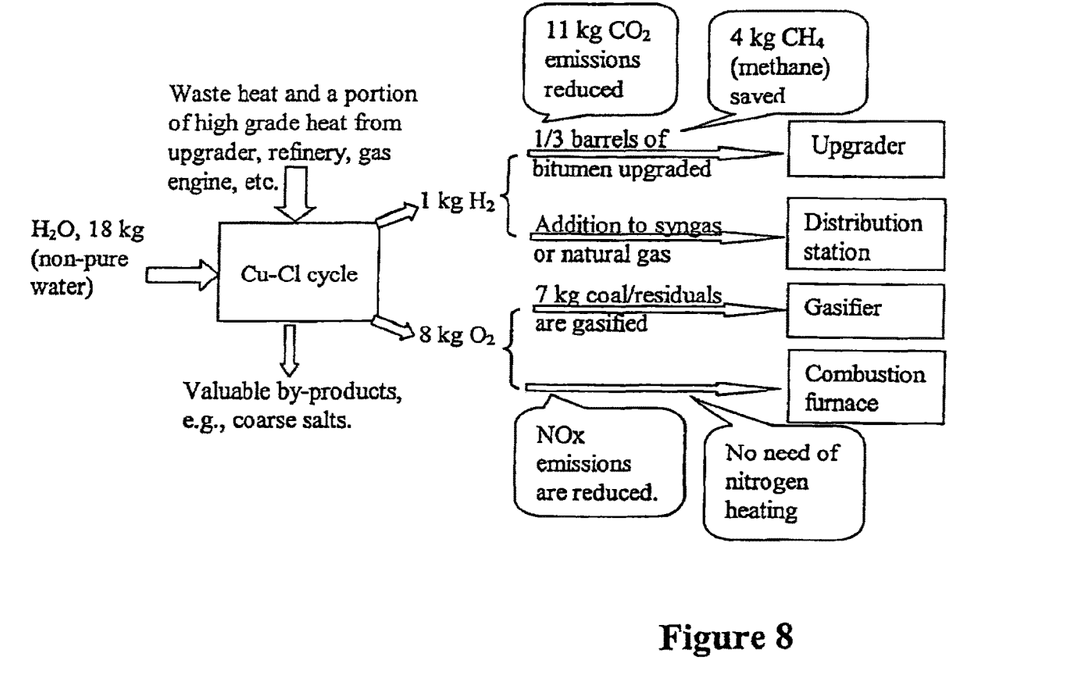
FIG. 8 is a schematic representation of the benefits of using the heat exchanger-steam generator apparatus and process described herein in petrochemical operations.

There are benefits to using the present technology in conjunction with petrochemical processes and these are illustrated in FIG. 8. Non-pure water, e.g. brackish water, can be used to produce hydrogen that can be used for operations, such as oil sands upgrading, refineries, enrichment of concentration of hydrogen in syngas, among others. Also, oxygen can be used for gasification of upgrading residuals or coal, improving combustion, reducing the use of air heating, and lowering NOx emissions. This technology is capable of using non-pure water to produce hydrogen and oxygen for upstream and downstream units of petrochemical plant operations.

Figure 6:
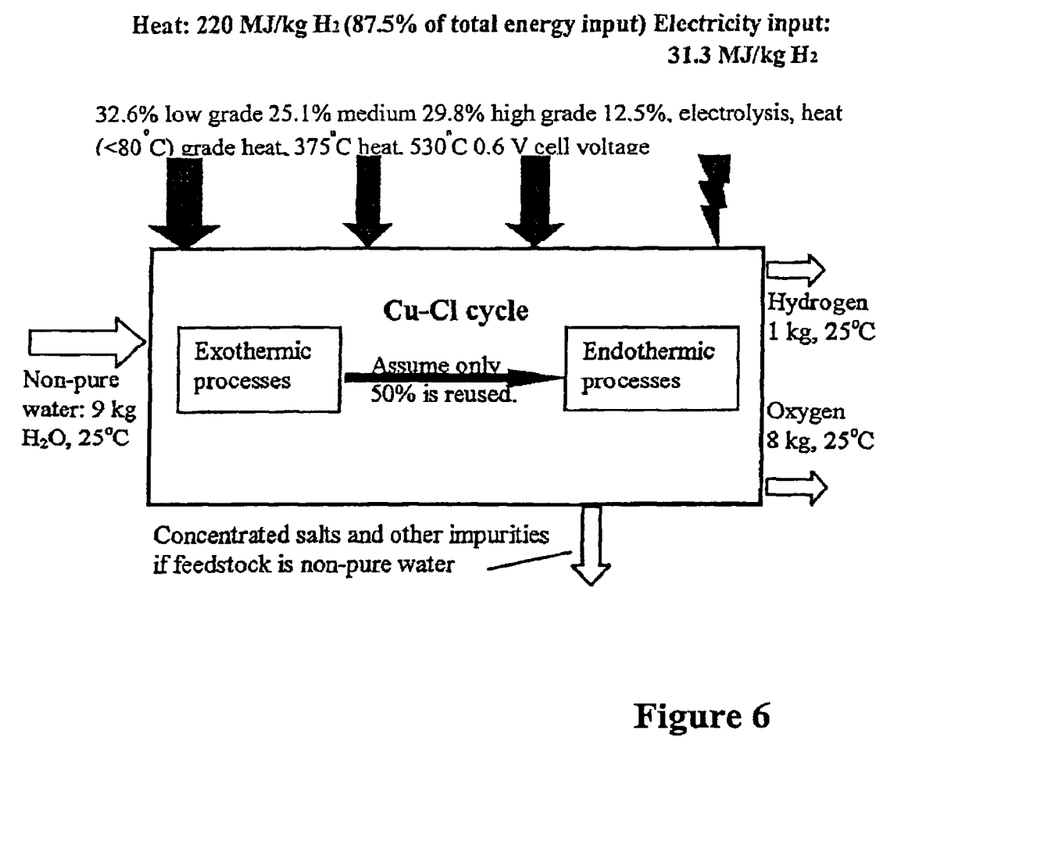
FIG. 6 illustrates the energy requirement distribution of the Cu—Cl Cycle.

FIG. 6 illustrates schematically the energy inputs and outputs for a typical CuCl Cycle derived from incorporating the present technology and equipment, which are considered to be significant.

Figure 7:
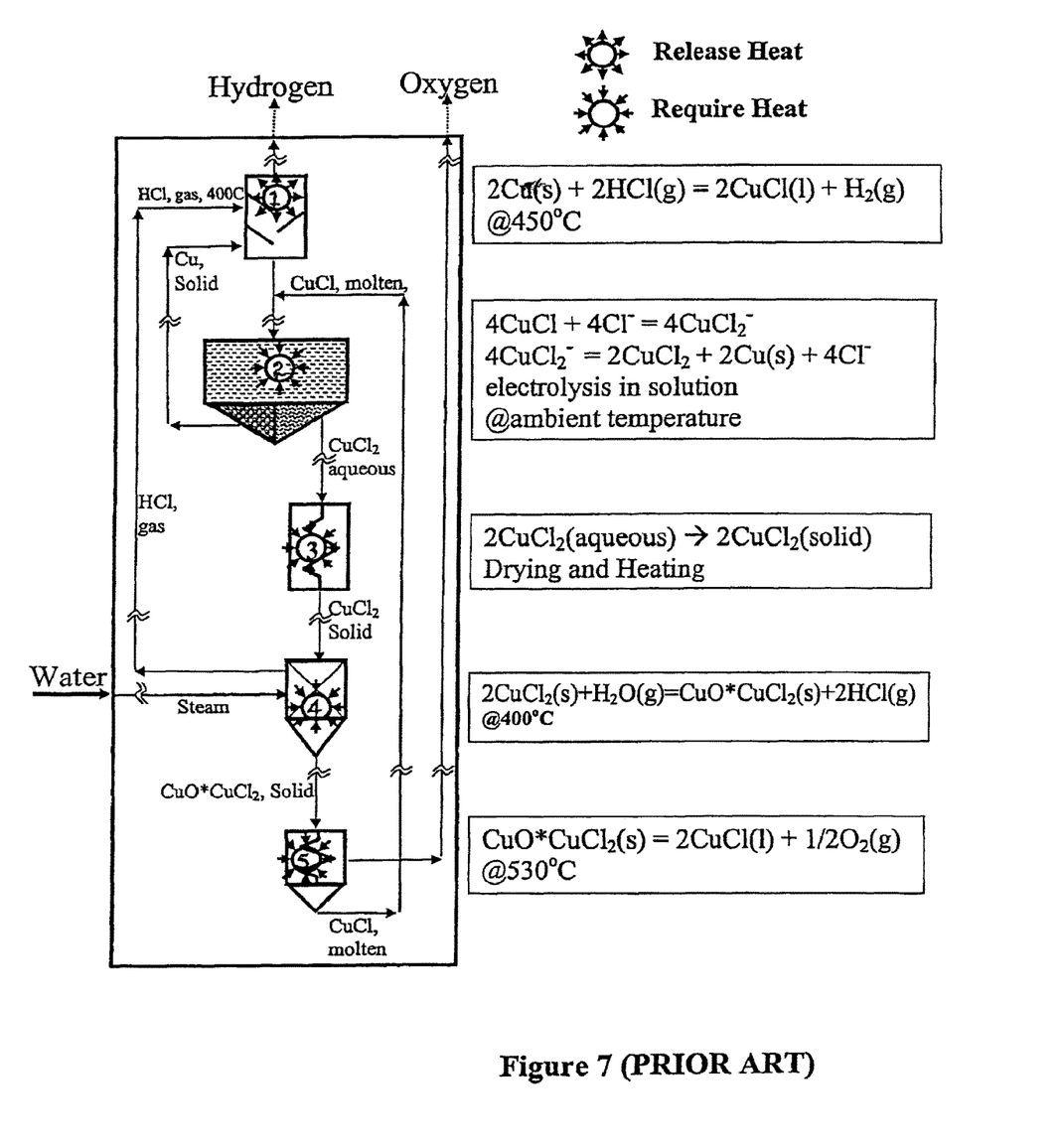
FIG. 7 illustrates a simplified flow chart of a typical Cu—Cl thermochemical cycle for the production of hydrogen gas from the decomposition of water.

FIG. 7 is a simplified representation of a prior art Cu—Cl Cycle, which is described in more detail in the previously referenced US Patent Publication No. 2010/012987. Reference may be had to the specific parts of this patent application which describe the contents of FIG. 7 in detail, where it appears as FIG. 5. In FIG. 7, an input of water is included. This represents an example of how the present technology could be combined with the Cu—Cl cycle.

The materials used to construct the apparatus of the present technology may be selected in accordance with the operating parameters of the equipment. The selection is within the common knowledge of a person skilled in the art.

The above description is meant to be exemplary only, and one skilled in the art will recognize that changes may be made to the embodiments described without departing from the scope of the invention disclosed. Modifications which fall within the scope of the present invention will be apparent to those skilled in the art, in light of a review of this disclosure, and such modifications are intended to fall within the appended claims.

We claim:

1. A high temperature thermochemical process for hydrogen production, the thermochemical process comprising:
   in a shell of a tube of a tube-and-shell heat exchanger, spraying non-pure water against an outer surface of a tube of the tube-and-shell heat exchanger to form a water film, the water containing impurities;
   transferring heat from a molten material inside the tube of the tube-and-shell heat exchanger to the water film formed by the non-pure water sprayed against the outer surface of the tube, the molten material obtained in the high temperature thermochemical process, causing the non-pure water to evaporate inside the shell side of the tube-and-shell heat exchanger to generate steam from the non-pure water, with impurities in the non-pure water being reduced to a precipitate, a slurry or a concentrated aqueous solution, which can be disposed of, or subjected to further processing;
   collecting the steam at a first location of the shell side of the tube-and-shell heat exchanger;
   removing the steam from the shell side of the tube-and-shell heat exchanger;
   producing hydrogen using the steam;
   collecting the impurities introduced in the shell side of the tube-and-shell heat exchanger by the non-pure water containing impurities received inside the shell of the tube-and-shell heat exchanger, the impurities deposited in the shell side of the tube-and-shell heat exchanger, wherein the impurities are collected at a second location of the shell side of tube-and-shell heat exchanger spaced apart from the first location along tube-and-shell heat exchanger; and removing the impurities from the shell side of the tube-and-shell heat exchanger;

wherein spraying the non-pure water against the outer surface of the tube is at a third location of the shell side of the tube-and-shell heat exchanger between the first location and the second location.

2. The process as claimed in claim 1, comprising generating the steam in a heat exchange process, wherein heat from the molten material is supplied directly to the non-pure water to produce the steam.

3. The process as claimed in claim 1, wherein the thermochemical process is a thermochemical Cu—Cl cycle for producing hydrogen gas from water decomposition which comprises supplying heat to the non-pure water from molten CuCl to produce the steam for the production of hydrogen gas.

4. A device for use in a high temperature thermochemical process where heat recovery is required and high temperature steam is produced which comprises using a tube and shell heat exchanger, the tube is arranged to receive a high temperature molten or gaseous material obtained from the high temperature thermochemical process and the shell is arranged to receive non-pure water sprayed on an outer surface of the tube of the tube-and-shell heat exchanger to form a water film to which heat is transferred from the high temperature molten or gaseous material in the tube causing the non-pure water to evaporate inside the shell side of the shell side of the tube-and-shell heat exchanger, which then generates high temperature steam from the non-pure water, with the impurities in the non-pure water being reduced to a precipitate, a slurry or a concentrated aqueous solution, which can be disposed of, or subjected to further processing, wherein tube-and-shell heat exchanger is configured to:

collect the steam at a first location of the shell side of the tube and shell heat exchanger;

collect the impurities at a second location of the shell side of tube-and-shell heat exchanger spaced apart from the first location along tube-and-shell heat exchanger; and remove the steam from the shell side of the tube-and-shell heat exchanger for production of hydrogen using the steam; and receive the non-pure water sprayed against the outer surface of the tube at a third location of the shell side of the tube-and-shell heat exchanger between the first location and the second location.

5. The device as claimed in claim 4, wherein the industrial process is a thermochemical Cu—Cl cycle for the production of hydrogen from water decomposition and the molten material is CuCl salt, and the high temperature steam is used to produce the hydrogen gas from decomposition of water in the thermochemical Cu—Cl cycle.

6. The device as claimed in claim 5, wherein the molten CuCl is received in the tube of the heat exchanger and passes therethrough with the assistance of at least one of gravity, a push-pull plate or a helical screw.

7. The device as claimed in claim 5, wherein the molten CuCl passes through the tube of the heat exchanger at a rate that allows the production of high temperature steam at a temperature suitable for the production of hydrogen gas from the decomposition of water in the thermochemical Cu—Cl cycle.

8. The device as claimed in claim 5, wherein the tube wall is treated with lubricant to assist passage of molten CuCl through the tube of the heat exchanger, in at least one of the following ways: in advance of the device being used, on a periodic basis and on a continuous basis during use of the device.

9. The device as claimed in claim 5, wherein the shell walls are washed with water or water containing cleaners or both to remove any adhered impurities that foul the reactor, the washing taking place either when the device is in use or when the device is not in use.

10. The device as claimed in claim 6, wherein a helical screw is used and assists the passage of molten CuCl through the tube as it passes from a molten state to a solid state, as well as the efficient heat transfer from the molten CuCl to the non-pure water.

11. The process as claimed in claim 1, wherein the molten material is a molten salt.

12. The process as claimed in claim 1, wherein the molten material is molten CuCl.

* * * * *